(12) United States Patent
Rivera

(10) Patent No.: US 10,875,150 B1
(45) Date of Patent: Dec. 29, 2020

(54) APPARATUS AND METHOD FOR AUTOMATIC TIRE REPLACEMENT

(71) Applicant: Paul Rivera, Orlando, FL (US)

(72) Inventor: Paul Rivera, Orlando, FL (US)

( * ) Notice: Subject to any disclaimer, the term of this patent is extended or adjusted under 35 U.S.C. 154(b) by 82 days.

(21) Appl. No.: 15/901,536

(22) Filed: Feb. 21, 2018

Related U.S. Application Data

(63) Continuation-in-part of application No. 14/858,037, filed on Sep. 18, 2015, now abandoned.

(51) Int. Cl.
*B24C 7/00* (2006.01)

(52) U.S. Cl.
CPC .......... *B24C 7/0015* (2013.01); *B24C 7/0038* (2013.01)

(58) Field of Classification Search
CPC ..... B24C 7/0015; B24C 7/0038; B60B 29/00; B60B 29/001; F15B 7/00; B60S 5/00; B60S 9/02
See application file for complete search history.

(56) References Cited

U.S. PATENT DOCUMENTS

| | | | |
|---|---|---|---|
| 6,527,234 B1 * | 3/2003 | Kovacik | A47B 21/0371 108/137 |
| 6,910,680 B1 * | 6/2005 | Geller | B60S 9/12 254/418 |
| 6,913,248 B1 * | 7/2005 | Schmitz | B60S 9/12 254/423 |
| 6,991,221 B1 * | 1/2006 | Rodriguez | B60S 9/12 254/418 |
| 7,294,797 B2 * | 11/2007 | Erickson | B60S 9/02 200/18 |
| 8,919,739 B1 * | 12/2014 | Romero | B60S 9/12 254/423 |
| 9,126,568 B1 * | 9/2015 | Reid, Jr. | B60S 9/08 |

* cited by examiner

*Primary Examiner* — John C Hong
(74) *Attorney, Agent, or Firm* — Wiggin and Dana LLP; Gregory S. Rosenblatt; Thomas M. Landman

(57) ABSTRACT

An automatic tire replacement apparatus is disclosed that has a hydraulic fluid line connected to a hydraulic fluid reservoir via a reservoir at one end a hydraulic fluid retainer at the other end. At least one hydraulic piston is provided that has a hollow barrel with an inner volume and an outer volume, a piston, and a piston rod with a first end and a second end within the inner volume of the hydraulic piston. The apparatus also contains a power rod, with a spiral thread, partially within the hollow barrel outer volume. The hollow barrel is connected to the hydraulic fluid retainer via an inner piston actuator and an outer piston actuator. The power rod is connected to the piston rod. A power bolt that has a set of inward facing pins is engaged with at least the power rod spiral thread.

10 Claims, 6 Drawing Sheets

APPARATUS AND METHOD FOR AUTOMATIC TIRE REPLACEMENT

CROSS-REFERENCE TO RELATED APPLICATION

This patent application is a continuation in part of U.S. patent application Ser. No. 14/858,037 titled "Automatic All Wheel Hydraulic Power Jack System." The disclosure of U.S. Ser. No. 14/858,037 is incorporated by reference herein in its entirety.

BACKGROUND OF THE DISCLOSURE

Tire replacement apparatuses typically consist of a manually actuated air jack, and a manual tire wrench. Presently, a tire and wheel may be replaced by placing an air jack below a motor vehicle chassis, manually pumping the jack to raise the motor vehicle such that the tires and wheels do not touch the ground and may be removed. A motorist may use a tire wrench to turn a set of lug nuts that are retaining a wheel until they are loose and disengaged from bolts on an axle that typically holds the wheel. A wheel may then be removed and replaced with a new wheel, and the lug nuts are replaced onto the wheel and tightened to secure the wheel in place. The present method and apparatuses for replacing a wheel require a significant amount of manual labor and a motorist must carry several separate tools in a motor vehicle at all times. The ability to execute a wheel replacement requires an individual to exit a car for an extended period of time and manually remove and replace lugs on a wheel, which is not always feasible or convenient. In some cases, a motorist may not have the tools or expertise necessary to replace a wheel when necessary.

There is a need for an apparatus and method for automatically replacing a tire and that requires minimal time and expertise, such that any motorist may replace a damaged tire without significant physical exertion. Further there is a need for a vehicle mounted apparatus and method for automatically replacing a tire that does not require external tools, such that a motorist with the apparatus may replace a damaged tire whenever necessary regardless of whether the motorist is traveling with wheel and tire replacement tools.

U.S. Pat. Nos. 8,424,848, 5,722,641, 699,221, European Patent No. EP-1184243, and International Patent Publication No. WO-2006-081533 each disclose a vehicle mounted hydraulic car lift and are incorporated herein by reference.

SUMMARY OF THE DISCLOSURE

In accordance with an aspect of the disclosure there is provided an automatic tire replacement apparatus that has a hydraulic fluid line with a first end and a second end. The first end of the hydraulic fuel line is connected to a hydraulic fluid reservoir via a reservoir actuator and the second end of the hydraulic fuel line is connected to a hydraulic fluid retainer. At least one hydraulic piston is provided that has a hollow barrel with an inner volume and an outer volume, a piston, and a piston rod with a first end and a second end within the inner volume of the hydraulic piston. The apparatus also contains a power rod that is at least partially within the outer volume of the hollow barrel. The hollow barrel is connected to the hydraulic fluid retainer via an inner piston actuator on the inner volume and an outer piston actuator on the outer volume. The power rod has a first end, a second end, and spiral thread. The first end of the power rod is connected to the second end of the piston rod. A power bolt that has a set of inward facing pins engaged with at least the spiral thread and the second end of the power rod.

DETAILED DESCRIPTION

An apparatus and method for automatically replacing a tire are described below.

Figure 1:
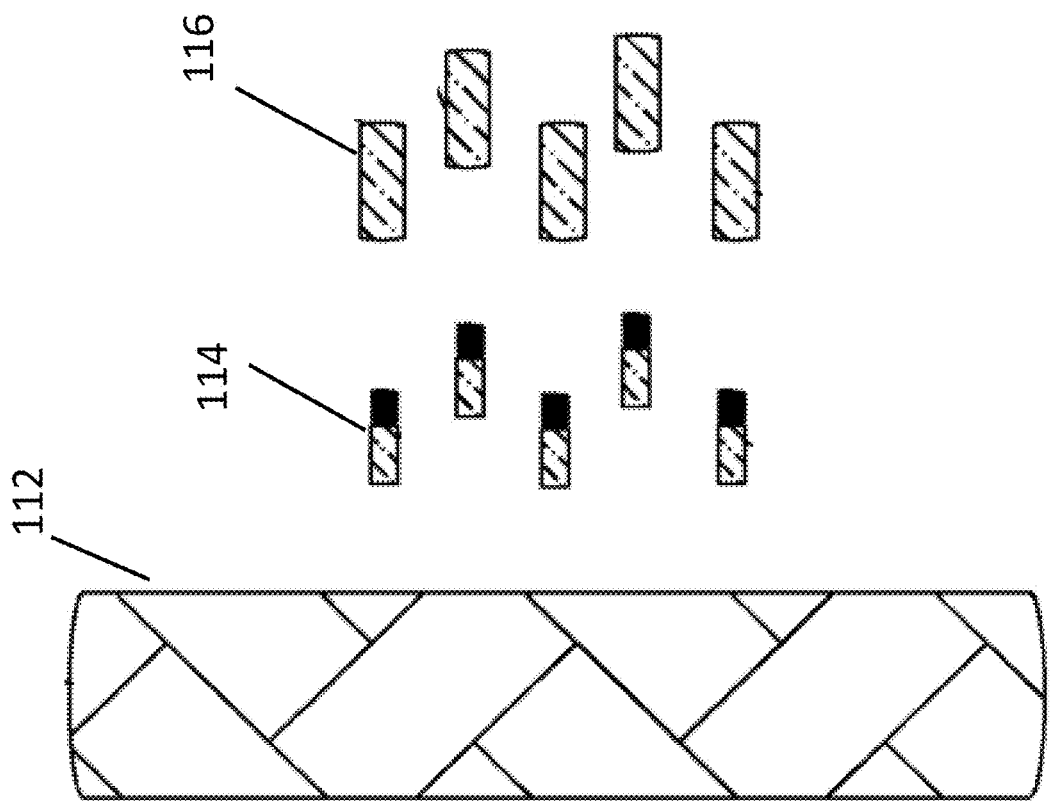
FIG. 1 schematically illustrates in cross section exploded view an embodiment of the automatic tire replacement apparatus and associated car elements.
Figure 1:
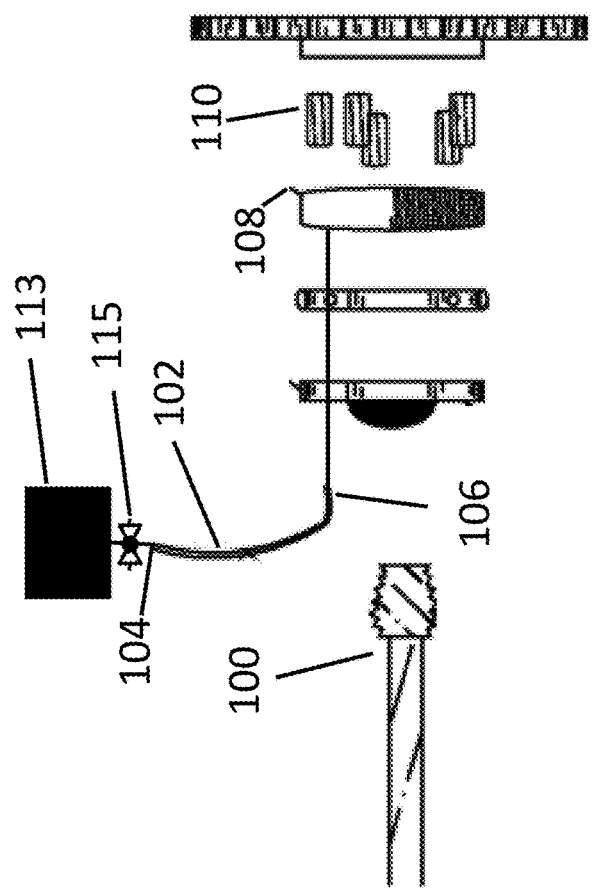

FIG. 1 illustrates in a cross section an axle 100 for a vehicle. The vehicle is typically a transportation vehicle, such as a passenger automobile, truck or bus. A hydraulic fluid line 102 having a first end 104 connected to a hydraulic fluid reservoir 113 and a second end 106 connected to a hydraulic fluid retainer 108. The hydraulic fluid retainer is connected to a plurality of hydraulic pistons 110. The hydraulic pistons are symmetrically arranged around the axis of a wheel 112 and the hydraulic fluid retainer 108. An exemplary number of hydraulic pistons is five. The wheel 112, a set of five power rods 114 and a set of five power bolts 116 are aligned with the hydraulic pistons 110. The hydraulic fluid line 102 connects at the first end 104 to hydraulic fluid reservoir 113 that includes an actuator 115. Opening the actuator 115 inputs hydraulic fluid into the automatic tire replacement apparatus. Further the hydraulic fluid reservoir 113 and the hydraulic fluid retainer 108 include actuators that control the flow of the hydraulic fluid.

Figure 2:
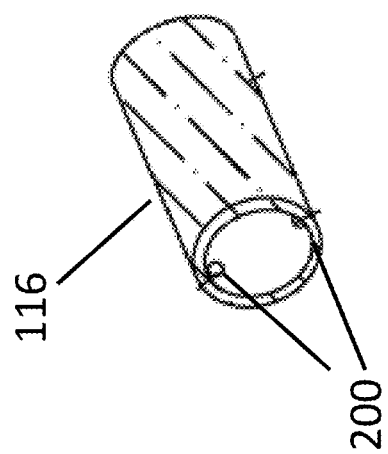
FIG. 2 illustrates a power bolt connected to a power rod from a cross sectional view and a perspective view and illustrates a power bolt from a perspective view.
Figure 2:
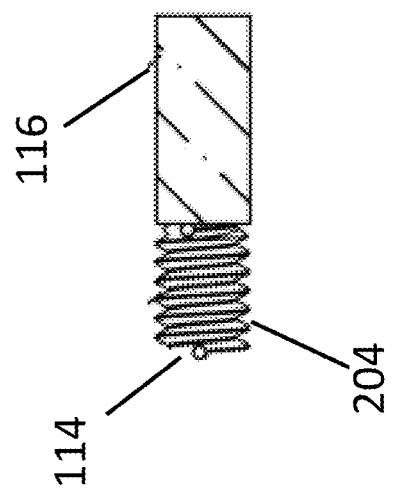
Figure 2:
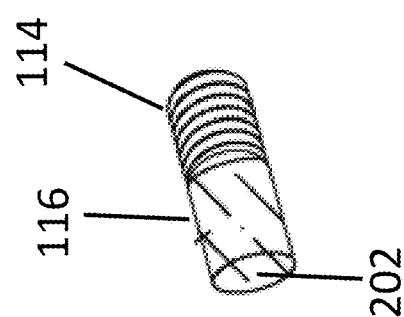

FIG. 2 illustrates an embodiment of a power rod 114 connected to a power bolt 116, and illustrates the power bolt 116 with inward facing locking pins 200 extended. In embodiments, inward facing locking pins 200 are extended and retracted by a locking button 202 on the power bolt 116. In embodiments two locking pins 200 may be situated 180 degrees apart from each other on the power bolt 116. In embodiments the locking pins 200 are used to engage the power bolt 116 to the power rod 114 and may be manually disengaged to remove the power bolt 116 from the power rod 114. Further, when the power bolt 116 is held in a rotationally stationary position, the relative horizontal movement of a power rod 114 with a spiral thread 204 creates rotational movement effective to fasten a power rod 114 to a power bolt 116.

Figure 3:
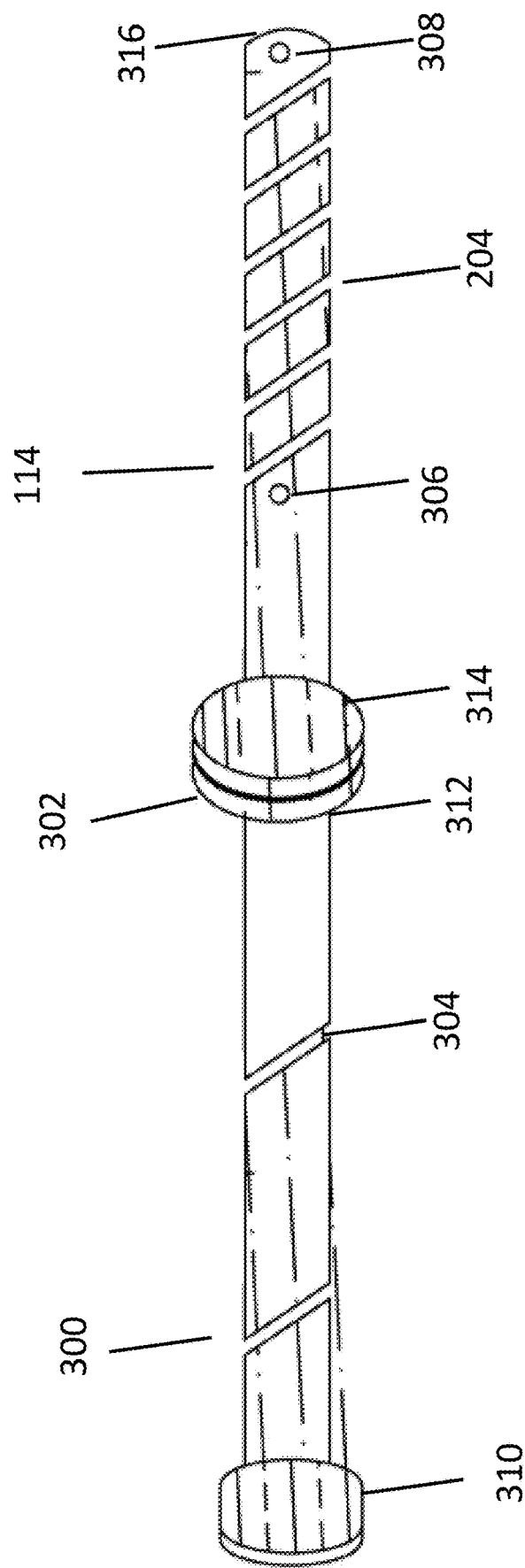
FIG. 3 illustrates a cross sectional view of the piston rod, piston, and power rod.

FIG. 3 illustrates an embodiment of a piston rod 300 having a first end 310 and a second end 312, a piston 302, and a power rod 114 having a first end 314 and a second end 316. In embodiments the piston rod may include a piston rod thread 304 that may be utilized similarly to the spiral thread 204. In embodiments the power rod 114 may include an outer lock notch, 308 and an inner lock notch 306, where a power bolt 116 may engage with the power rod spiral thread 204 via power bolt locking pins 200. In embodiments hydraulic fluid pressure may be applied to the piston 302 in either direction to translate the piston rod 300 and power bolt 116 in a horizontal direction. In embodiments, if the piston rod thread 304, or the spiral thread 204 are engaged with a stationary object, the power bolt 116 and the piston rod 300 may rotate as they are translated horizontally.

Figure 4:
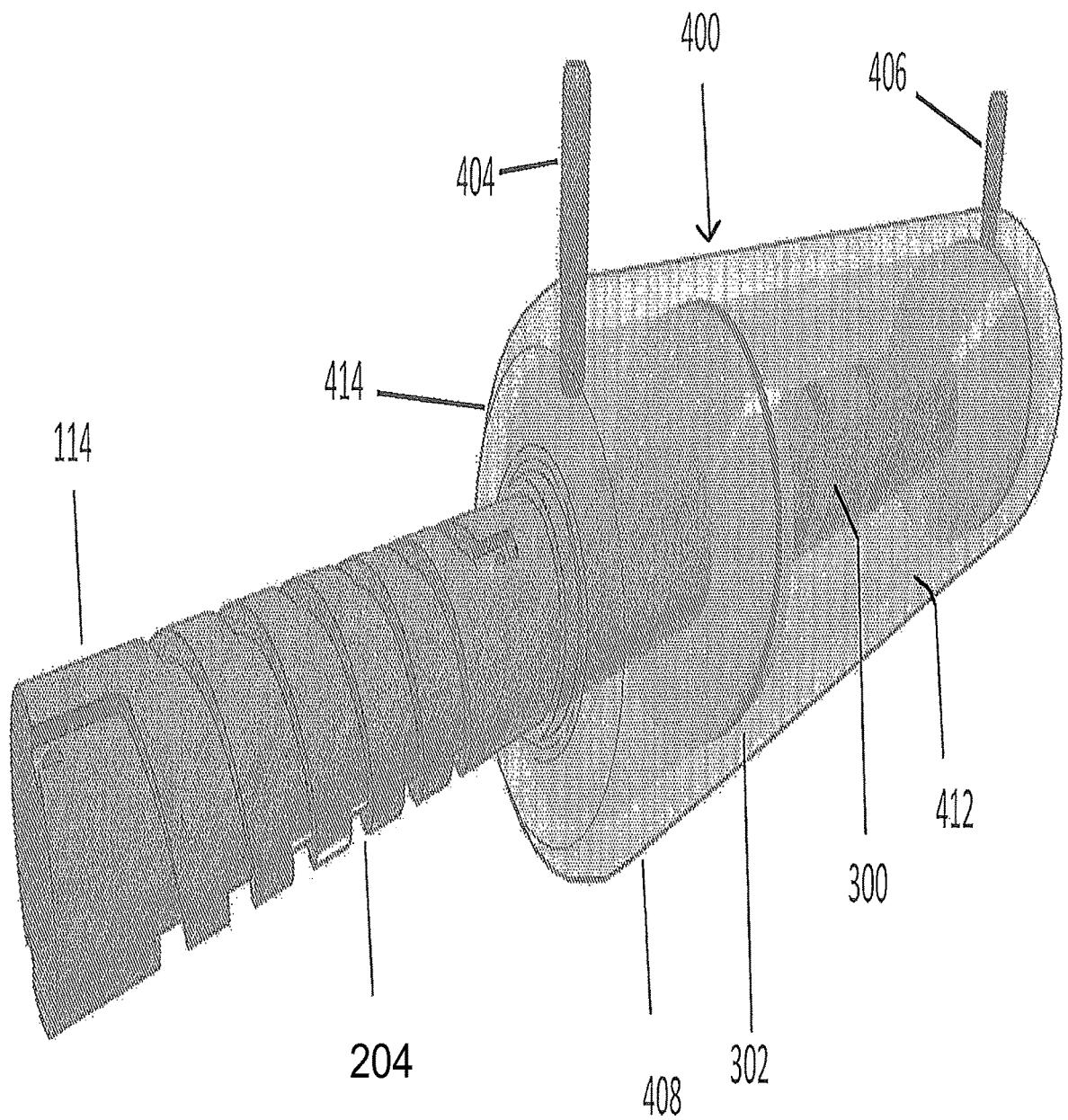
FIG. 4 illustrates a perspective cut away view of the hydraulic piston and the power rod.

FIG. 4 illustrates an embodiment of a power rod 114 connected to a hydraulic piston 400 having a hollow barrel 414, a piston 302 a piston rod 300, an inner volume 412, an outer volume 408, an inner piston actuator 406 and an outer piston actuator 404. In embodiments, the inner piston actuator 406 may release hydraulic fluid into the inner volume 412 to act on the piston 302 and move the piston rod 300 and the power rod 114 outwardly in a horizontal direction while the outer piston actuator 404 may simultaneously release hydraulic fluid from the outer volume 408 into the hydraulic fluid retainer. Similarly in embodiments, the outer piston actuator 404 may release hydraulic fluid into the outer volume 408 to act on the piston 302 and move the piston rod 300 and the power rod 114 inwardly while the inner piston actuator 406 may release hydraulic fluid from the outer volume into the hydraulic fluid retainer. Hydraulic fluid may be any fluid capable of being pressurized including oil and air.

Figure 5:
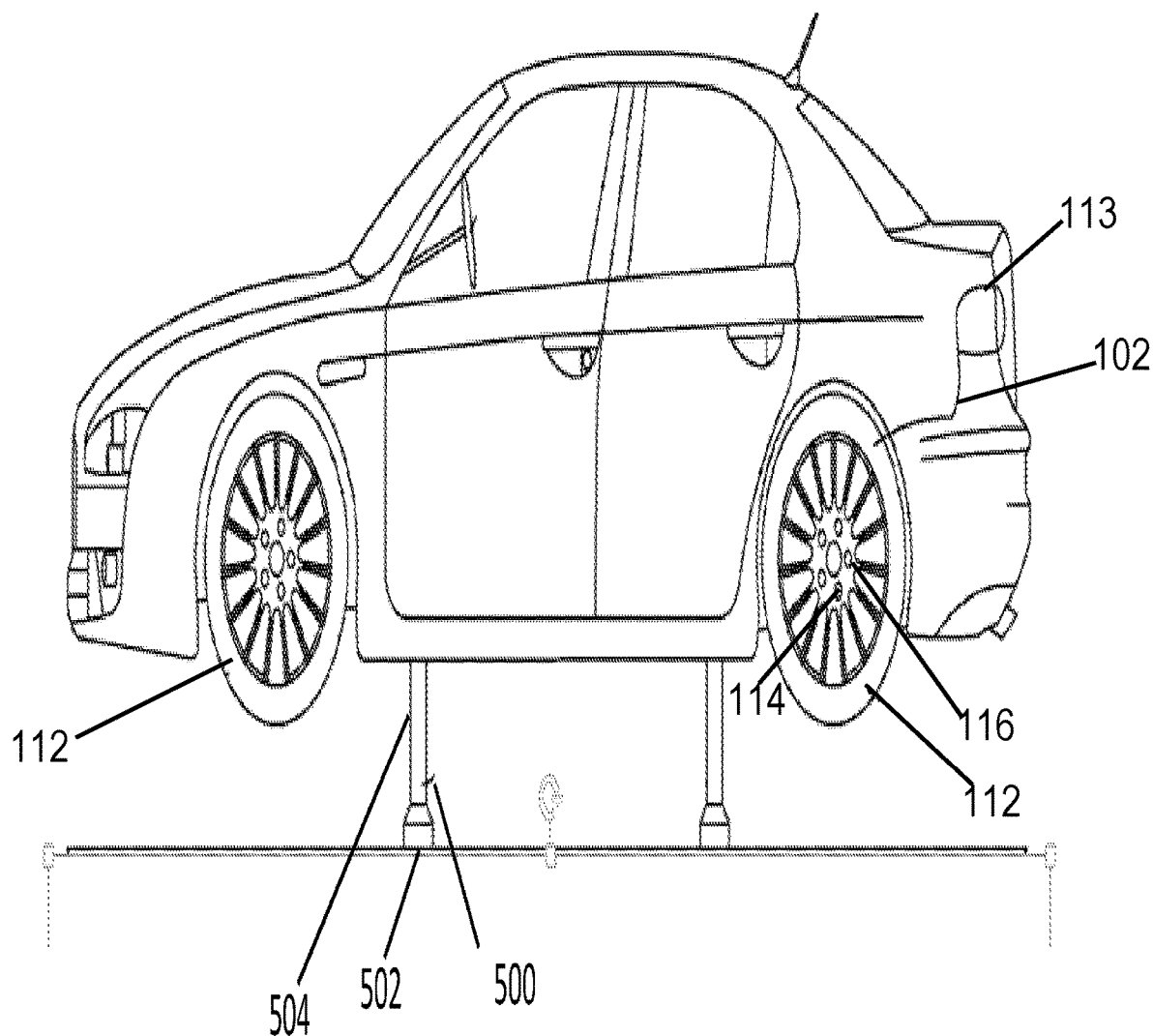
FIG. 5 illustrates a cross-sectional view of a car equipped with the automatic tire replacement apparatus and with the automatic lift system installed and extended.

FIG. 5 illustrates a car equipped with an automatic tire replacement apparatus and an extended automatic power jack 500. This drawing depicts the automatic tire replacement apparatus, of which the hydraulic fluid line 102, the hydraulic fluid reservoir 113, the power rods 114 and the power bolts 116 are shown, as disposed within the chassis of a motor vehicle. In embodiments, the automatic car jack may comprise four bases 502 that collapse into the chassis of the vehicle. The bases may be pressurized by hydraulic fluid to extend outwardly from the chassis and elevate the motor vehicle. In embodiments the jack 500 may include an extending body 504 and a base 502. In embodiments the power jack 500 may be activated to lift the motor vehicle such that the tires no longer touch the ground, and the power jack 500 may be deactivated to lower the motor vehicle such that the tires touch the ground. The automatic power jack 500 may be powered by a separate power source.

Figure 6:
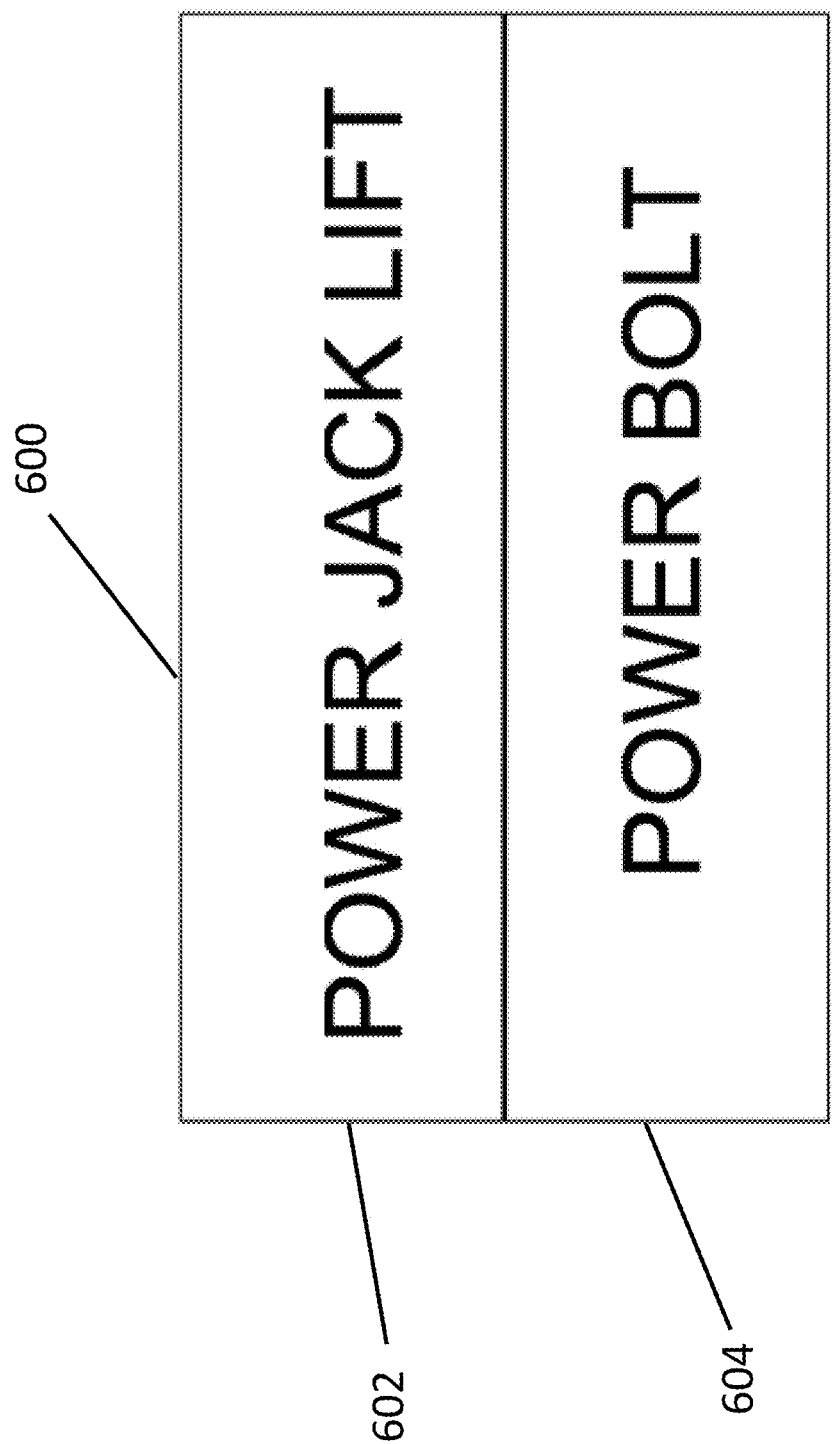
FIG. 6 illustrates a touch screen used to control functions of the apparatus for automatically replacing a tire.

FIG. 6 illustrates an embodiment of a touch screen 600 that may be used to control the automatic tire replacement apparatus. In embodiments the touch screen 600 may display a lift control 602 to activate the power jack 500, and a power bolt control 604 to loosen and tighten the power bolt in the automatic tire replacement apparatus. In embodiments, the touch screen 600 may be docked to a charger mounted to an automobile glove compartment. The touch screen 600 may also be a wireless device that connects wirelessly to a wireless receiver integrated into the automatic tire replacement apparatus using a wireless signal such as Bluetooth or Wi-Fi.

The invention claimed is:

1. A tire replacement apparatus contained within a chassis of a motor vehicle that loosens and tightens lugs retaining a tire to the motor vehicle, comprising:
   a hydraulic fluid line having a first end and a second end where the first end is connected to a hydraulic fluid reservoir via a reservoir actuator and the second end is connected to a hydraulic fluid retainer;
   at least one hydraulic piston comprising a hollow barrel with an inner volume and an outer volume, a piston, and a piston rod having a first end and a second end within the inner volume;
   a power rod at least partially within the outer volume of the hollow barrel, where the hollow barrel is connected to the hydraulic fluid retainer via an inner piston actuator on the inner volume and an outer piston actuator on the outer volume;
   the power rod having a first end, a second end, and spiral thread, where the first end of the power rod is connected to the second end of the piston rod; and
   a power bolt having a set of inward facing locking pins engaged with at least the spiral thread and the second end of the power rod.

2. The tire replacement apparatus of claim 1 further comprising a power jack having a plurality of bases, each of the plurality of bases extendable from a collapsed position within the chassis to an extended position effective to elevate the motor vehicle.

3. The tire replacement apparatus of claim 2 where the power rod contains outer lock notches.

4. The tire replacement apparatus of claim 3 where the power rod contains inner lock notches.

5. The tire replacement apparatus of claim 4 where the piston rod has a piston rod thread.

6. The tire replacement apparatus of claim 5 where the piston rod thread is engaged with a rotationally stationary object.

7. The tire replacement apparatus of claim 6 where the piston rod thread is at a more shallow angle than the spiral thread.

8. The tire replacement apparatus of claim 7 where the hydraulic fluid is air.

9. The tire replacement apparatus of claim 7 where the hydraulic fluid is oil.

10. The tire replacement apparatus of claim 7 where the power bolt further comprises a locking button.

* * * * *